US008108124B2

(12) United States Patent
Jung et al.

(10) Patent No.: US 8,108,124 B2

(45) Date of Patent: Jan. 31, 2012

(54) METHOD FOR DETERMINING AN UNCONTROLLED ACCELERATION OF AN INTERNAL COMBUSTION ENGINE

(75) Inventors: Uwe Jung, Wörth a. d. Donau (DE); Janos Radeczky, Wenzenbach (DE); Michael Wirkowski, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 302 days.

(21) Appl. No.: 12/523,885

(22) PCT Filed: Jan. 22, 2008

(86) PCT No.: PCT/EP2008/050672

§ 371 (c)(1), (2), (4) Date: Jul. 21, 2009

(87) PCT Pub. No.: WO2008/090135

PCT Pub. Date: Jul. 31, 2008

(65) Prior Publication Data

US 2010/0049426 A1 Feb. 25, 2010

(30) Foreign Application Priority Data

Jan. 22, 2007 (DE) ......................... 10 2007 003 150

(51) Int. Cl.

*G06F 19/00* (2011.01)
*F02M 69/46* (2006.01)
*F02M 51/00* (2006.01)
*G01M 15/00* (2006.01)

(52) U.S. Cl. ........ 701/104; 123/456; 123/458; 123/492; 701/110; 701/114; 73/114.43

(58) Field of Classification Search .......... 701/101–104, 701/110–111, 114–115; 123/436, 446, 456, 123/305, 458, 476, 494–495, 492; 73/114.04, 73/114.05, 114.43

See application file for complete search history.

(56) References Cited

U.S. PATENT DOCUMENTS

| | | | | |
|---|---|---|---|---|
| 4,138,979 A * | 2/1979 | Taplin | ........................... | 123/436 |
| 4,379,332 A * | 4/1983 | Busser et al. | ................. | 701/105 |
| 5,492,098 A * | 2/1996 | Hafner et al. | ................. | 123/446 |
| 6,732,714 B2 | 5/2004 | Frenz et al. | .................. | 123/479 |
| 7,130,736 B2 * | 10/2006 | Bishop et al. | ................. | 701/104 |
| 7,240,667 B2 | 7/2007 | Dolker | .......................... | 123/456 |
| 7,431,018 B2 * | 10/2008 | Tsujimoto | ..................... | 123/446 |
| 7,779,819 B2 * | 8/2010 | Serra et al. | .................... | 123/514 |

(Continued)

FOREIGN PATENT DOCUMENTS

DE 3804012 8/1989

(Continued)

OTHER PUBLICATIONS

German Office Action for Application No. 10 2007 003 150.7 (3 pages), Oct. 9, 2007.

(Continued)

*Primary Examiner* — Willis Wolfe, Jr.
*Assistant Examiner* — Johnny Hoang
(74) *Attorney, Agent, or Firm* — King & Spalding L.L.P.

(57) ABSTRACT

In a method for determining an uncontrolled acceleration of an internal combustion engine, a valve opening cross section is allocated to each load state of the internal combustion engine. In the event that a controller value is outside a limit range, an uncontrolled acceleration of the internal combustion engine is thereby detected.

12 Claims, 1 Drawing Sheet

U.S. PATENT DOCUMENTS

| | | | | |
|---|---|---|---|---|
| 2006/0249120 | A1* | 11/2006 | Semii et al. | 123/446 |
| 2007/0125343 | A1* | 6/2007 | Hayakawa | 123/447 |
| 2007/0157908 | A1* | 7/2007 | Kano et al. | 123/520 |
| 2008/0103675 | A1* | 5/2008 | Ishizuka et al. | 701/103 |
| 2009/0063019 | A1* | 3/2009 | Yamada et al. | 701/104 |
| 2009/0063022 | A1* | 3/2009 | Ishizuka et al. | 701/106 |
| 2009/0171524 | A1 | 7/2009 | Pitzal et al. | 701/29 |
| 2009/0254262 | A1* | 10/2009 | Kweon et al. | 701/104 |

FOREIGN PATENT DOCUMENTS

| | | |
|---|---|---|
| DE | 10032263 | 2/2001 |
| DE | 10141821 | 4/2003 |
| DE | 10162989 | 10/2003 |
| DE | 102004061474 | 6/2006 |
| DE | 102005014161 | 10/2006 |
| DE | 102005021952 | 11/2006 |

OTHER PUBLICATIONS

International Search Report and Written Opinion for Application No. PCT/EP2008/050672 (10 pages), May 28, 2008.

* cited by examiner

METHOD FOR DETERMINING AN UNCONTROLLED ACCELERATION OF AN INTERNAL COMBUSTION ENGINE

CROSS-REFERENCE TO RELATED APPLICATIONS

This application is a U.S. National Stage Application of International Application No. PCT/EP2008/050672 filed Jan. 22, 2008, which designates the United States of America, and claims priority to German Application No. 10 2007 003 150.7 filed Jan. 22, 2007, the contents of which are hereby incorporated by reference in their entirety.

TECHNICAL FIELD

The invention relates to a method for determining an uncontrolled acceleration of an internal combustion engine.

BACKGROUND

Fuel injection devices for the operation of an internal combustion engine have been generally known for many years. In the case of a so-called common rail injection system, the fuel is supplied to the relevant combustion chamber of the internal combustion engine by means of injectors, in particular by means of piezo injectors. In such cases, with fuel injection systems the generated engine torque is dependent on factors such as the amount of fuel injected per stroke. In this process, in the injection systems the amount of fuel is not measured itself, but is calculated by means of the injection duration and the prevailing fuel pressure. Should there be a fault in the system that increases the amount injected such as for example a jamming injector and/or a rail pressure sensor giving false measurements, then the increase in the amount of fuel is not detected. In this case, the generated torque does not correspond to the wish of the driver and the vehicle may, unintended by the driver, accelerate. In the worst case, it may lead to a "run away" meaning an uncontrolled acceleration of the internal combustion engine, which can lead to its destruction.

SUMMARY

According to various embodiments, a method can be made available that determines an unintended increase in the amount of fuel and thereby an unintended acceleration of the internal combustion engine.

According to an embodiment, a method for determining an uncontrolled acceleration of an internal combustion engine with an injection system, in particular a common rail injection system with a control unit, which controls the difference between a target pressure that can be assumed and an actual pressure determined in a high-pressure reservoir by means of a volume flow-based controlled line, and with a diagnostic unit, may comprise the steps of producing a control value by the control unit, which serves as the regulated quantity for the volume flow-dependent control path, and identifying an uncontrolled acceleration of the internal combustion engine by means of a diagnostic unit at the moment when the control value lies outside a predeterminable first limit range, with the first limit range including the control values produced for all the operating conditions of the volume-flow dependent control path.

According to a further embodiment, the volume flow-dependent control path can be implemented by a volume flow-dependent control valve. According to a further embodiment, for each operating condition of the internal combustion engine, the valve opening position of the control valve can be plotted in an engine map. According to a further embodiment, the output value of the control unit can be added to an operation-dependent dependent pilot control value and serves as the regulated quantity for the volume flow-dependent control path. According to a further embodiment, a test can be performed by means of a diagnostic unit in order to determine whether or not the controller input value and/or the controller output value lie within a second predeterminable limit range, with the second limit range fully including the first limit range.

BRIEF DESCRIPTION OF THE DRAWINGS

Details of the invention are described in more detail below with reference to the schematic figures of the drawings, in which.

DETAILED DESCRIPTION

The advantages achieved with the various embodiments consist in particular in the identification of an unintended acceleration of the internal combustion engine by an observation of an output value of a regulating unit. This enables further measures to be taken in order to prevent the uncontrolled acceleration of the internal combustion engine by for example a control device. In addition, the method makes possible, as a function of the operating condition of the internal combustion engine in each case, a plausibility check in order to determine the amount of fuel in the injection system. As a result, it is possible to check at each point in time whether or not a leakage has occurred within the injection system because here a higher amount of fuel compared with an injection system without leakage is flowing through the injection system.

Figure 1:
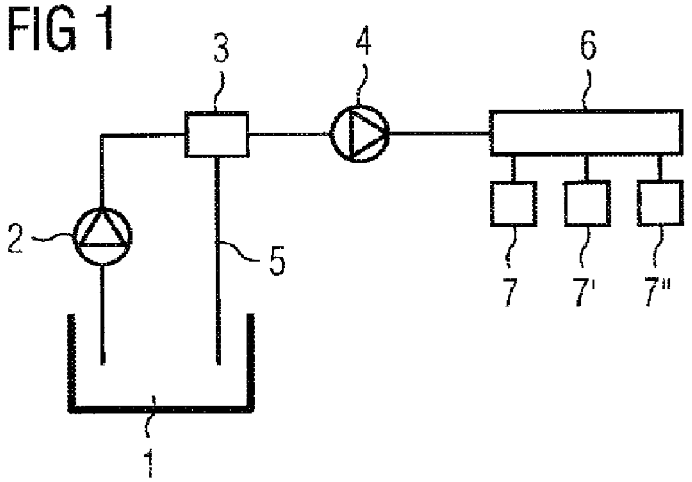
FIG. 1: shows a block diagram of an injection system for regulating the fuel to be injected.

FIG. 1 shows a block diagram of an injection system for regulating the amount of fuel injected. In this diagram, the injection system consists of a fuel tank 1, a low-pressure pump 2 that draws fuel from the tank, a volume flow control valve 3 with a return line 5 to the fuel tank 1, a high-pressure pump 4, which feeds fuel into a high-pressure reservoir 6 and injectors 7, 7' and 7" for injecting fuel into a combustion chamber of the internal combustion engine, not shown in the drawing.

By means of a low-pressure pump 2 fuel is drawn from the fuel tank 1 and then fed to a high-pressure pump 4. The high-pressure pump 4 then feeds a high-pressure reservoir 6 with the fuel supplied from the low-pressure pump 2. In this process, pressures of up to 1800 bar may build up in the high-pressure reservoir 6. By means of injectors 7, 7' and 7", fuel can be injected from the high-pressure reservoir 6 into a combustion chamber. In order to be able to regulate the pressure within the high-pressure reservoir 6, a volume flow control valve 3 is arranged between the low-pressure pump 2 and the high-pressure pump 4 with a return line 5 to the fuel tank. The induction volume of the high-pressure pump 2 is regulated by means of the volume flow control valves.

Figure 2:
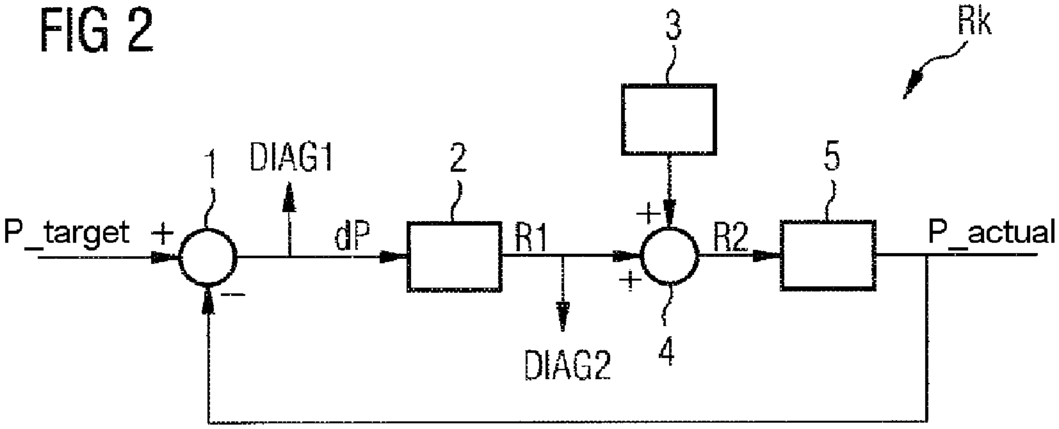
FIG. 2: shows a block diagram of an automatic control system for determining an uncontrolled acceleration of an internal combustion engine.

FIG. 2 shows a block diagram of an automatic control system RK for determining an uncontrolled acceleration of an internal combustion engine. Starting from a pressure target value P_target fed to the inlet 1, the automatic control system RK consists of a control unit 2, a controlled line unit 5 and a connecting element 4 arranged inbetween to feed a pilot control value generated in a pilot control unit 3, which forms together with the output signal R1 of a control unit 2, the input signal R2 of the controlled line unit 5. The output signal P_actual of the controlled line unit 5 is returned to the inlet 1 and corresponds to the current pressure in the high-pressure reservoir. In addition, inside the automatic control system RK there are two diagnostic units DIAG1 and DIAG2, which check the values selected for the automatic control system RK for plausibility. The DIAG2 also has the task of determining whether or not an uncontrolled acceleration of the internal combustion engine is present.

At the inlet 1 of the automatic control system RK, by subtracting the output signal P_actual of the controlled line unit 5 from the pressure target value P_target, which can be assumed, a difference signal dp is formed, which serves as the input value for the control unit 2. The difference signal dp is checked beforehand by means of a first diagnostic unit DIAG1 in order to determine whether or not this value is plausible for the specific operating condition of the internal combustion engine. In this process, an implausible value is determined by means of the fact that the value to be checked exceeds a second limit range. This second limit range is related to a first limit range that is based on an allocation of the valve opening position of the controlled line to each operating point.

The output signal R1 of the control unit 2 is likewise checked for plausibility by means of a second diagnostic unit DIAG2.

In this process, the method for checking the output signal R1 is carried out in a similar way to the method of the first diagnostic unit DIAG1. In addition, in the second diagnostic unit DIAG2 an additional check takes place in order to determine whether or not the output signal R1 falls outside the normal operating range of the control unit 2. This method is again described in more detail in relation to the description relating to FIG. 3. As already mentioned, the output signal R1 of the control unit 2 is added to a pilot control value of the pilot control unit 3. In this case, the pilot control value may be constant or vary in time. As particularly advantageous, it was found that the pilot control value each time depends on the operating condition of the internal combustion engine.

The control path unit 5 in this process is a volume flow-based control valve for example. By means of a characteristic map recorded in the system, a valve opening position of the control valve can be allocated to the input signal R2 of the control path unit 5. The pressure in the high-pressure reservoir, not shown in the drawing, can be controlled on the basis of the valve opening position of the control valve of the control path unit 5.

Figure 3:
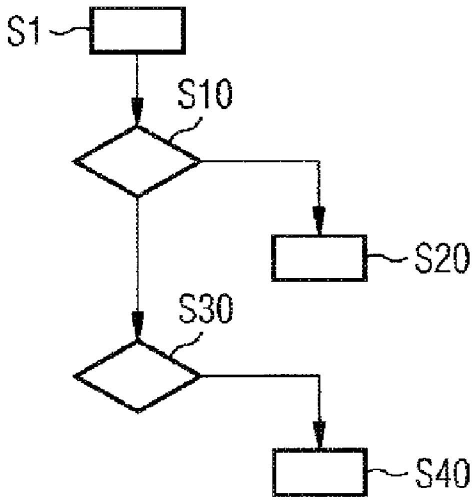
FIG. 3: shows a flow diagram of the process sequence in the diagnostic unit DIAG2 for determining whether or not an uncontrolled acceleration of the internal combustion engine is present.

FIG. 3 shows a flow diagram of the process sequence in the diagnostic unit DIAG2 for determining whether or not an uncontrolled acceleration of the internal combustion engine is present. In a step S1, the output value of the control unit 2 is determined by means of the second diagnostic unit DIAG2. In this process, a plausibility check of the output value of the control unit takes place in a step S10. For this purpose, a check is made as to whether or not the output value lies within a predeterminable second limit range.

Should the output value not be within the predeterminable second limit range, further measures are introduced via the system in a step S20. Should the output value of the control unit be within the predetermined second limit range, it is checked in addition whether or not the output value lies within a predeterminable first limit range. In this case the first limit range is completely within the second limit range.

In this case this first limit range is based on an allocation of the valve opening position of the control path to each operating point. Therefore, it corresponds to the working range of the control valve. If the injected amount of fuel is to be increased as a result of a leakage for example, the volume flow must, in order to keep the pressure in the high-pressure reservoir constant, rise through the control valve. This can take place by enlarging the valve opening cross section. This increased volume flow through the control valve again brings about an increase in the output value of the control unit. Should the output value of the control unit be outside the first limit value in such a case an uncontrolled acceleration is then identified in a step S40 and further measures can be introduced.

What is claimed is:

1. A method for determining an uncontrolled acceleration of an internal combustion engine with an injection system with a control unit, which controls a difference between a target pressure that can be assumed and an actual pressure determined in a high-pressure reservoir by means of a volume flow-based controlled line, and with a diagnostic unit, the method comprising the steps of:

producing a control value by the control unit, which serves as a regulated quantity for a volume flow-dependent control path, and identifying an uncontrolled acceleration of the internal combustion engine by means of a diagnostic unit at the moment when the control value lies outside a predeterminable first limit range, wherein the first limit range includes the control values produced for all the operating conditions of the volume-flow dependent control path.

2. The method according to claim 1, wherein the volume flow-dependent control path is implemented by a volume flow-dependent control valve.

3. The method according to claim 1, wherein for each operating condition of the internal combustion engine, a valve opening position of the control valve is plotted in an engine map.

4. The method according to claim 1, wherein the output value of the control unit is added to an operation-dependent pilot control value and serves as the regulated quantity for the volume flow-dependent control path.

5. The method according to claim 1, wherein a test is performed by means of a diagnostic unit in order to determine whether or not at least one of the controller input value and the controller output value lie within a second predeterminable limit range, wherein the second limit range fully includes the first limit range.

6. The method according to claim 1, wherein the injection system is a common rail injection system with a control unit.

7. A system for determining an uncontrolled acceleration of an internal combustion engine with an injection system with a control unit, which controls a difference between a target pressure that can be assumed and an actual pressure determined in a high-pressure reservoir by means of a volume flow-based controlled line, wherein the control unit is operable to produce a control value, which serves as a regulated quantity for a volume flow-dependent control path, and wherein the system comprises a diagnostic unit which is operable to identify an uncontrolled acceleration of the internal combustion engine at the moment when the control value lies outside a predeterminable first limit range, wherein the first limit range includes the control values produced for all the operating conditions of the volume-flow dependent control path.

8. The system according to claim 7, further comprising a volume flow-dependent control valve for implementing the volume flow-dependent control path.

9. The system according to claim 7, wherein for each operating condition of the internal combustion engine, a valve opening position of the control valve is plotted in an engine map.

10. The system according to claim 7, wherein the output value of the control unit is added to an operation-dependent pilot control value and serves as the regulated quantity for the volume flow-dependent control path.

11. The system according to claim 7, wherein a test is performed by means of a diagnostic unit in order to determine whether or not at least one of the controller input value and the controller output value lie within a second predeterminable limit range, wherein the second limit range fully includes the first limit range.

12. The system according to claim 7, wherein the injection system is a common rail injection system with a control unit.

* * * * *